United States Patent

Ratigan et al.

[19]

[11] 4,313,827
[45] Feb. 2, 1982

[54] ENHANCED DISINFECTION SYSTEM

[75] Inventors: Brian J. Ratigan, Philadelphia; Robert N. Roop, Buckingham, both of Pa.

[73] Assignee: Fischer & Porter Co., Warminster, Pa.

[21] Appl. No.: 184,031

[22] Filed: Sep. 4, 1980

[51] Int. Cl.³ .............................. C02F 1/50; C02F 1/76
[52] U.S. Cl. .................................. 210/136; 210/192;
210/198.1; 210/206; 210/236; 210/754;
210/764; 239/311; 239/424.5; 239/425;
239/434; 261/DIG. 75; 422/37; 422/49;
422/113
[58] Field of Search .......................... 422/113, 37, 49;
261/DIG. 75; 210/753, 754, 764, 136, 192,
198.1, 206, 236; 239/311, 421, 424.5, 425, 434;
366/167

[56] References Cited

U.S. PATENT DOCUMENTS

| | | | |
|---|---|---|---|
| 2,564,060 | 8/1951 | Gettins | 261/DIG. 75 |
| 2,889,995 | 6/1959 | Borell | 239/311 UX |
| 3,735,778 | 5/1973 | Garnier | 239/425 X |
| 3,833,356 | 9/1974 | Lutz | 239/425 X |
| 3,833,719 | 9/1974 | Kuerten et al. | 261/76 X |
| 4,019,983 | 4/1977 | Mandt | 261/76 X |
| 4,255,360 | 3/1981 | Jeffries | 261/DIG. 75 |

*Primary Examiner*—Barry Richman
*Attorney, Agent, or Firm*—Michael Ebert

[57] ABSTRACT

A disinfectant system for intermingling a disinfectant with an effluent to be treated, such as wastewater, to kill pathogens therein, the system enhancing contact between the effluent and the disinfectant to effect a rapid and efficient disinfection action. The system includes an ejector through which a minor portion of the effluent is pumped to produce a motive fluid which induces a disinfectant therein to produce a concentrated disinfectant fluid. Th ejector terminates in a cylindrical diffuser section having a closed end and at least two circumferential series of orifices whereby the disinfectant fluid is discharged therefrom as high velocity jets which project radially with respect to the longitudinal axis of the section. The diffuser section is coaxially disposed at the inlet of a tubular mixing duct which conducts the effluent from a sump tank into a contact tank at relatively low velocity, whereby the effluent is intercepted by a radial array of jets to provide an effective mixing action in the duct in a relatively short period. Supported at the outlet of the duct is a conical baffle to define a lateral outlet therefor, causing the effluent to discharge radially from the duct into the contact tank, thereby enhacing the mixing action in the duct and maximizing the retention time in the contact tank.

8 Claims, 6 Drawing Figures

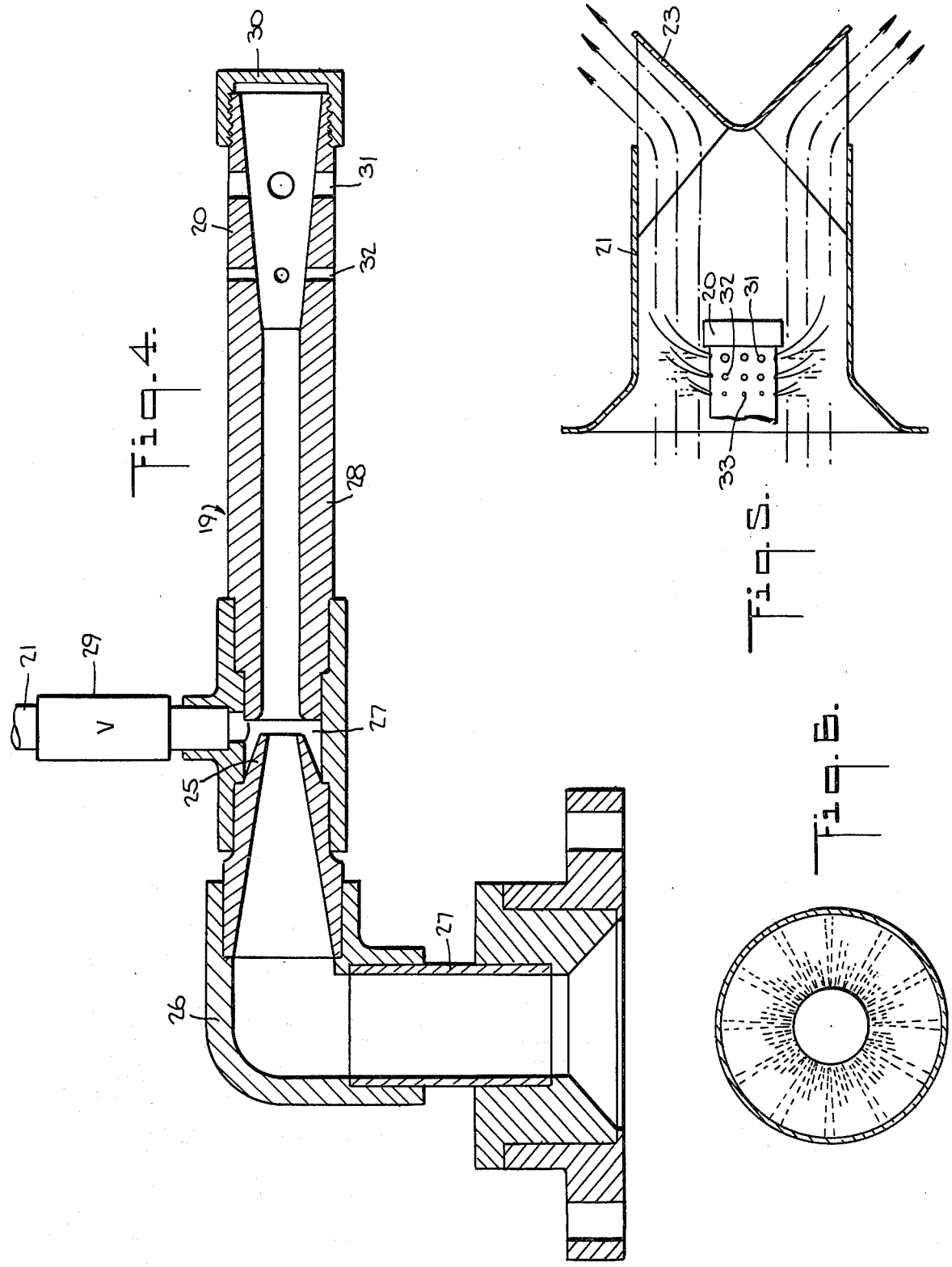

ENHANCED DISINFECTION SYSTEM

BACKGROUND OF INVENTION

This invention relates generally to techniques for intermingling a disinfectant with wastewater to be treated to kill pathogens therein, and more particularly to an enhanced disinfection system adapted to enhance contact between a disinfectant and a water stream to effect a rapid and efficient disinfection action.

Chlorination is widely used to purify water supplies. In practice, chlorine is introduced at a selected point in the water supply system, flow then taking place into a tank or through a region of flow which is sufficient for the chlorine to act effectively on the contaminants present in the water to produce a disinfecting action. The amount of chlorine added to the water is referred to as the "dosage," and is usually expressed as milligrams per liter (mg/l) or parts per million (ppm). The amount of chlorine used up or consumed by bacteria, algae, organic compounds and some inorganic substances, such as iron or manganese, is designated as the "demand."

Since many of the reactions with chlorine are not instantaneous, but require time to reach completion, chlorine demand is time-dependent. The amount of chlorine remaining in the water at the time of measurement is referred to as the "residual." Residual is therefore determined by the demand subtracted from the dosage. Inasmuch as chlorine demand is time-dependent, this dependency is likewise true of chlorine residual.

When chlorine dissolves in water, a mixture of hypochlorous and hydrochloric acids is formed. The hydrochloric acid always completely dissociates into hydrogen and chloride ions, whereas the hypochlorous acid only partially dissociates into hydrogen and hypochlorite ions as a function of the pH of the water. In either the hypochlorous or hypochlorite form, chlorine is called "free chlorine residual." Free chlorine residual has a highly effective killing power toward bacteria.

Should the chlorinated water contain ammonia or certain amino (nitrogen-based) compounds, as is invariably the case with sewage, then additional compounds, called chloramines, are created. Chloramines may occur almost instantaneously, depending mainly on water pH. Though several reactions are possible between hypochlorous acid and ammonia, chloramines collectively are referred to as "combined chlorine residual." This combined chlorine residual has a much lower bactericidal effect than free chlorine residual.

Domestic wastewater is typically high in ammonia, the ammonia resulting primarily from hydrolysis of urea. Almost all of the inorganic nitrogen formed in solutions that enter a waste treatment plant is normally in the least oxidized, ammonia form. In conventional secondary waste treatment, a portion of the ammonia will be completely nitrified to nitrite, some ammonia will be only partially nitrified to nitrite, and a portion will remain as ammonia.

When sufficiently high chloride dosages are applied to waters containing ammonia, different reactions will occur, resulting in the destruction of the ammonia and the formation of free chlorine residual. Thus, for water containing a known amount of ammonia, if one starts with a chlorine dosage which is low, chloramines will be formed resulting in a combined chlorine residual whose bactericidal effect is relatively weak.

As the dosage is raised, the amount of combined chlorine residual produced also increases, until a peak is reached when all of the free ammonia is used up in the formation of chloramine. And as the dosage is elevated beyond the level at which the combined chlorine residual peaks, destruction of the chloramines, which are unstable, takes place until a breakpoint is reached indicating that chloramine destruction is at its maximum. At breakpoint, the first persistent appearance of free chlorine occurs. Thus by using a chlorine dosage sufficient to attain the breakpoint state, one is able to get rid of virtually all ammonia and most of the chloramines.

The virtues of chlorination have long been appreciated, but it is only recently that the hazards involved in excessive chlorination have been publicly recognized. In studies carried out in the chlorinated water supply of the City of New Orleans, it was found that the levels of chlorination were such as to release carcinogenic agents dangerous to the community. The results of this study are reported in the article by R. A. Harris, "The Implication of Cancer Causing Substances in Mississippi River Water," published by the Environmental Defense Fund, Washington, D.C., Nov. 6, 1974.

Shortly after this study appeared, Public Law 93-523 went into effect authorizing the EPA administrator to conduct a comprehensive study of public water supplies "to determine the nature, extent, sources of, and means of control of contamination by chemicals or other substances suspected of being carcinogens."

Subsequently, Jolley ("Chlorine-containing Organic Constituents in Chlorinated Effluents"—Journal of the Water Pollution Control Fed., 47:601-618 (1975) reported the presence of forty-four chloro-organic compounds in a chlorinated secondary wastewater effluent.

Many applications exist for chlorine in wastewater treatment facilities, such as for odor control of raw sewage and the control of hydrogen sulfide in sewers, but its most universal application lies in wastewater treatment facilities for the terminal disinfection of the treated plant effluent just before the effluent is discharged.

The formation of compounds suspected of being carcinogenic as a result of the reaction of chlorine with hydrocarbons in wastewater is by no means the only unwanted side effect caused by the traditional disinfection process, for chlorine residuals in wastewater give rise to an environment that is toxic to aquatic organisms. Though chlorine is a highly effective biocide for undesirable organisms, it is also deadly to fish and other forms of aquatic life and therefore has a deleterious impact on fresh water eco-systems.

In general, wastewater disinfection practice has heretofore largely disregarded these unwanted side effects, for this practice focused on the two factors thought to be of greatest significance in attaining adequate disinfection; namely, the residual of the disinfectant and its contact time with the sewage. This practice has brought about the use of massive doses of disinfectant in long serpentine channels serving to prolong contact time. While this produced the desired degree of disinfection, it also aggravated unwanted side effects.

In order to obtain adequate disinfection with minimal unwanted side effects, the now-recognized goal is to carry out rapid, intimate mixing of the chlorine solution with the wastewater stream in the shortest possible period. Thus one of the most important facets of a good chlorinator installation is the chlorine solution diffuser which injects the chlorine into the pipe or channel carrying the potable water or wastewater to be disinfected.

Ideally, the mixing time for the chlorine solution should be a fraction of a second. With a view to overcoming the limitations of conventional diffuser arrangements, a jet disinfection technique has been developed to accelerate the mixing activity, this technique being described in the "Penberthy Jet Disinfection Technical Bulletin" published in 1977 by the Pentech Division of Houdaille Industries, Inc. of Cedar Falls, Iowa.

The U.S. Patent to Mandt, No. 4,019,983, which is directed to the Penberthy technique, discloses a disinfection system in which fluid derived from a wastewater stream to be treated is fed under pressure through an inlet leading to an inner nozzle coaxial with an outer nozzle. Aqueous chlorine is supplied to the region between the two nozzles; and as the motive fluid is forced through the inner nozzle, it educts the chlorine emerging from the outer nozzle to produce a jet stream of wastewater intermingled with chlorine solution.

The nozzle structure in Mandt is disposed within a mixing conduit conducting the wastewater stream, the jet stream being projected forwardly into the mixing conduit in a direction more or less parallel to the direction of wastewater flow. Because of this relationship, a relatively long mixing conduit is required to obtain adequate disinfection. Also of background interest in a similar context is the gas and liquid mixing system disclosed in the Kuerten U.S. Pat. No. 3,833,719.

SUMMARY OF INVENTION

In view of the foregoing, the main object of this invention is to provide a disinfection system for treating an effluent, such as wastewater, in a manner enhancing contact between the disinfectant and the effluent to effect a rapid and efficient disinfectant action. Because of the relatively slow rate of chloramine formation compared to the reaction rate between chlorine and bacterial virus, rapid mixing in accordance with the invention promotes thorough contact of pathogens with the disinfectant before competing reactions act to reduce chlorine to its less effective forms.

The present invention is directed to a system for rapidly and uniformly disinfecting liquids such as drinking water or waste liquids such as partially-treated sewage. Suitable disinfectants for this purpose may be either in gaseous or liquid form and include chlorine gas, ozone, chlorine dioxide, aqueous chlorine solution as well as bromine and iodine solutions. Though chlorine gas is a preferred form of disinfectant—for it has greater disinfection power than a chlorine solution—it is to be understood that the invention which is disclosed in a system making use of chlorine gas as the disinfectant, is not limited thereto and is applicable to other fluidic forms of disinfectant.

More particularly, it is an object of this invention to provide an enhanced disinfection system in which an effluent to be treated is subjected to an array of disinfectant jets which are projected in directions normal to the direction of effluent flow to enhance the interaction therebetween, whereby rapid, intimate mixing of the disinfectant with the effluent is carried out in the shortest possible time with minimal unwanted side effects.

Also an object of the invention is to provide an efficient and effective enhanced disinfection system of relatively simple, low cost design.

Briefly stated, these objects are attained in a disinfectant system for intermingling a disinfectant with an effluent to be treated such as wastewater to kill pathogens therein, the system enhancing contact between the effluent and the disinfectant to effect a rapid and efficient disinfectant action.

This system includes an ejector through which a minor portion of the effluent is pumped to produce a motive fluid which induces a disinfectant therein to produce a concentrated disinfectant fluid. The ejector terminates in a cylindrical diffuser section having a closed end and at least two circumferential series of orifices whereby the disinfectant fluid is discharged therefrom as high velocity jets which project radially with respect to the longitudinal axis of the section.

The diffuser section is coaxially disposed at the inlet of a tubular duct which conducts the effluent from a sump tank into a contact tank at relatively low velocity, whereby the effluent is intercepted by a radial array of jets to provide an effective mixing action in the duct in a relatively short period. Supported at the outlet of the duct is a conical baffle to define a lateral outlet therefor, causing the effluent to discharge radially from the duct into the contact tank, thereby enhancing the mixing action of the duct and maximizing the retention time in the contact tank.

OUTLINE OF DRAWINGS

For a better understanding of the invention as well as other objects and further features thereof, reference is made to the following detailed description to be read in conjunction with the accompanying drawings, wherein:

FIG. 4 is a section taken through the ejector and diffuser included in the system;

FIG. 5 schematically illustrates the formation of the jets produced by the diffuser within the mixing duct of the system; and FIG. 6 schematically shows an array of jets created by the diffuser within the duct.

DESCRIPTION OF INVENTION

Figure 1:
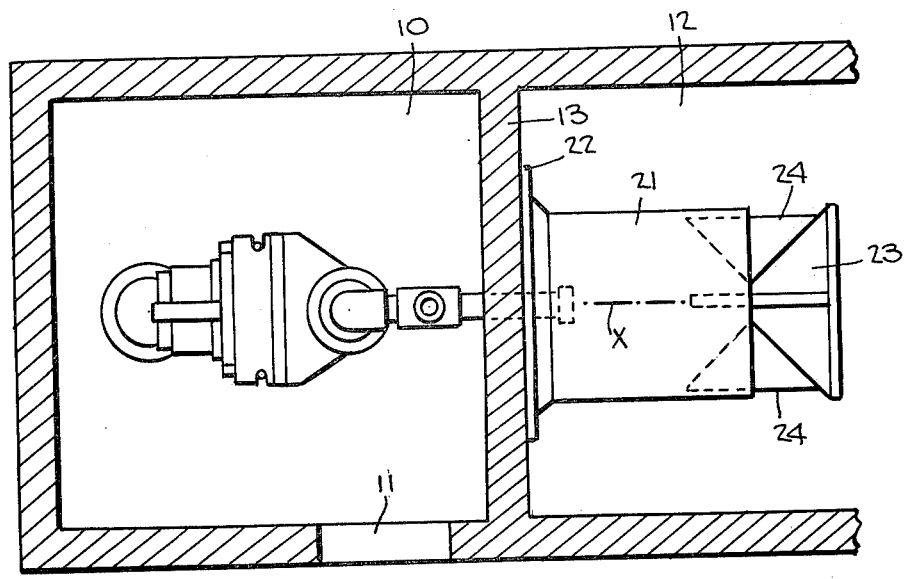
FIG. 1 is a top plan view of an enhanced disinfection system in accordance with the invention and including a sump tank and a contact tank.
Figure 2:
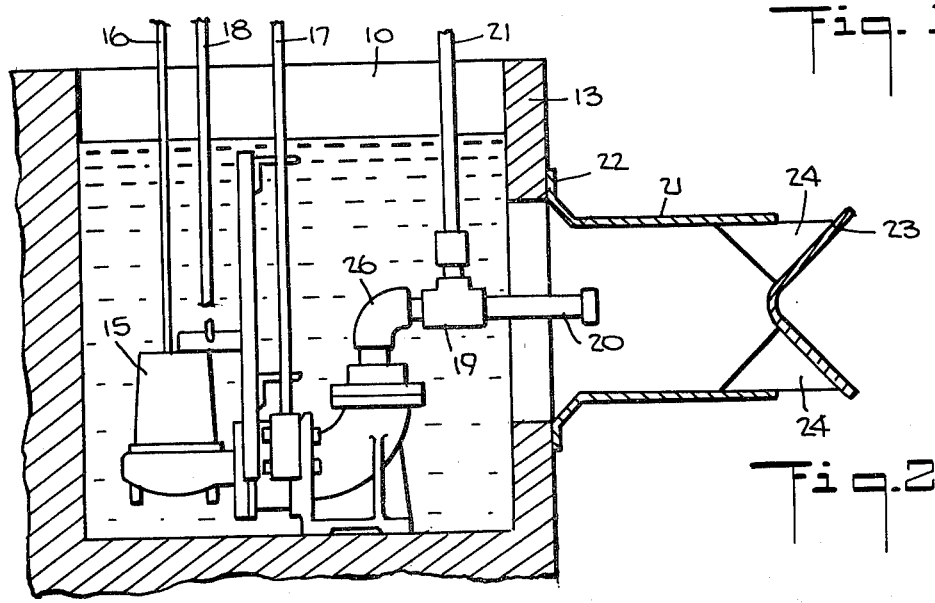
FIG. 2 is a longitudinal section taken through the tanks.
Figure 3:
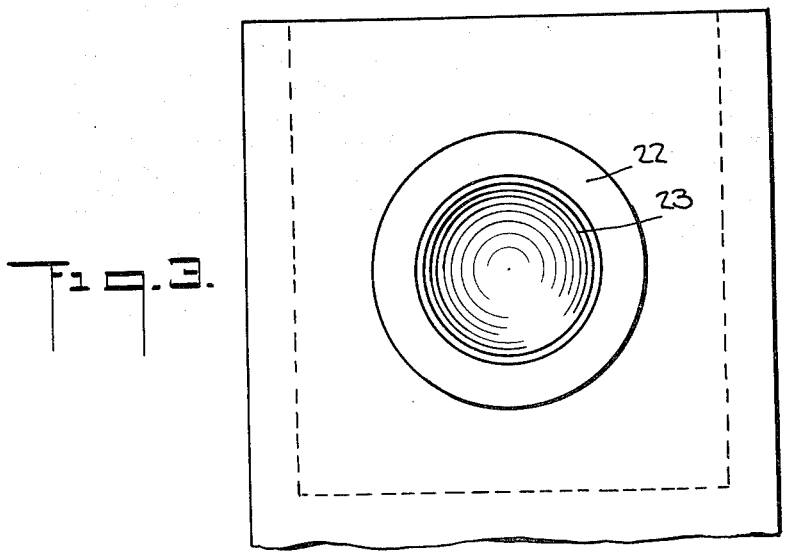
FIG. 3 is an end view taken in the contact tank.

Referring now to FIGS. 1 to 3, there is shown a disinfectant enhancement system in accordance with the invention, the system including a sump tank or chamber 10 into which the effluent to be treated is fed through an input port 11. Chamber 10 is separated from a contact tank or chamber 12 by a partition wall 13 having a circular port 14. The term "effluent," as used herein, is intended to cover any liquid to be treated such as wastewater.

Submerged in sump chamber 10 is an electrically-operated motor-driven pump 15 supplied with power by a flexible power line 16. In order to raise and lower the pump into the sump chamber for repair and maintenance purposes, a vertical guide rail 17 is provided with is slidably engaged by shoes extending laterally from the pump assembly, pump elevation being effected by a hoist cable 18.

Pump 15 draws a minor portion of the effluent from sump chamber 10 and forces it through a cylindrical ejector 19 which terminates in a diffuser section 20. The ejector is coupled by a flexible pipe 21 to a disinfectant source, preferably in the form of a chlorine gas supply. Mounted over circular port 14 in wall 13 and disposed in contact chamber 12 is a tubular mixing duct 21 whose inlet end is provided with an annular mounting flange 22 secured to wall 13. Attached to the outlet end of duct 21 is a baffle 23 having a conical formation, the peak of the cone being aligned with the longitudinal axis X of duct 21.

Baffle 23 is secured to duct 21 by a set of equilateral triangular vanes 24. One side of each vane is welded or otherwise secured to the baffle, the base of the vane being secured to the inner wall of the duct. The arrangement is such as to create an annular space between the outlet end of the duct and the perimeter of the baffle whereby liquid is discharged radially from the duct into contact chamber 12 rather than in the axial direction.

Referring now to FIG. 4 showing ejector 19 in greater detail, it will be seen that the ejector is provided with a converging nozzle 25 whose input mouth is coupled by a knuckle 26 to a line 27 communicating with pump 15. In this way a minor portion of the effluent in sump chamber 10 is supplied to nozzle 25 under pressure and serves as the motive fluid for the ejector.

Nozzle 25 projects the motive fluid into a zone 27 defined between the nose of the nozzle and the adjacent inlet of a throat section 28 of uniform internal diameter. Throat section 28 terminates in diffuser section 20 which has a diverging or tapered internal diameter. Because the fluid is forced under pressure through converging nozzle 25, this creates a high vacuum in zone 27 which acts to induce chlorine gas into the zone, the chlorine intermingling with the motive fluid. Chlorine is drawn into zone 27 through a check valve 29 interposed in gas pipe 21 to prevent back flow from zone 27 into the pipe.

The gas intermingled with the motive fluid is forced into throat section 28 whose length is such as to permit adequate dispersal of the gas in the fluid, throat 28 leading into diffuser section 20 whose end is closed by a cap 30. Diffuser section 20 is provided with two circumferential series of orifices, the orifices in the first series 31 being of larger diameter than those in the second series 32. In practice, there can be more than two circumferential series of orifices of progressively diminishing diameter. Thus in FIG. 5, the diffuser section is shown as having three series of orifices, the third series having orifices 33.

The cylindrical diffuser section 20 at the end of the ejector has its longitudinal axis aligned with axis X of tubular duct 21 so that the diffuser section is coaxial with the duct at the inlet end thereof. The concentrated disinfectant fluid is discharged under pressure from the circumferential series of orifices (31, 32 and 33) as high velocity jets radially with respect to the longitudinal axis of the diffuser section.

As shown in FIGS. 5 and 6, in the absence of an effluent flowing through the duct, the radially projected jets are normal to the longitudinal axis of the diffuser. Since the jets from the large diameter orifices have more force than those from the smaller orifices, they have a greater penetrating power in the effluent stream. And since the direction of effluent flow is at right angles to the jet direction, the stream tends to displace the jets downstream. In FIG. 5, the jets, in the absence of the effluent stream, are shown in dotted lines. The formation of these jets when they are displaced by the stream is shown in solid lines.

Because of these differences in penetrating power, the jets from the large orifices extend from the diffuser section to the inner wall of the mixing tube, as shown in FIG. 6. Those projected from orifices of intermediate size extend about three quarters of the way to the inner wall, and those from the small orifices, about half way. As a consequence, the radial array of jets formed by the diffuser section defines a dense curtain of disinfectant which is intercepted by the effluent stream to create a highly turbulent condition promoting dispersal of the disinfectant in the effluent stream. In practice, the velocity of the jets is about five times greater than that of the effluent passing through the duct.

Because baffle 23 impedes the flow of effluent out of mixing duct 21 and discharges the effluent therefrom with a radial component rather than longitudinally, the baffle acts to further promote mixing activity within the duct, the duct being long enough to confine the flow until mixing is complete. And since it discharges the chlorinated fluid into the control tank ominidirectionally, this acts to maximize the retention time in the contact tank receiving the effluent to be treated.

While there has been shown and described a preferred embodiment of an enhanced disinfection system in accordance with the invention, it will be appreciated that many changes and modifications may be made therein without, however, departing from the essential spirit thereof.

We claim:

1. An enhanced disinfectant system for intermingling a disinfectant with an effluent stream, said system comprising:

A. a mixing duct through which said effluent stream is conducted from a sump chamber into a contact chamber;

B. an ejector coupled to said disinfectant source and terminating in a cylindrical diffuser section having a closed end, said diffuser section being coaxially disposed at the inlet to said duct and having at least one circumferential series of orifices;

C. pump means drawing a minor portion of said effluent from said sump chamber and feeding it under pressure into said ejector as the motive fluid therefor to create a vacuum educting said disinfectant from the source to produce a disinfectant fluid which is emitted from the circumferential series of orifices of the diffuser section in the form of radial jets projecting at right angles to the direction of effluent flow and at a velocity substantially greater than the velocity of said effluent stream to create a disinfectant curtain that is intercepted and detected by said stream, whereby said disinfectant fluid is dispersed in said stream to intermix therewith in a relatively short time before the stream is discharged into said contact chamber; and D. a baffle secured to the outlet of the duct and spaced therefrom to define a lateral discharge opening therebetween from which the disinfected effluent is discharged radially into said contact tank, said baffle impeding the discharge of the effluent to further promote rapid mixing of the disinfectant fluid and the effluent stream in said duct.

2. A system as set forth in claim 1, wherein said duct extends into said contact chamber.

3. A system as set forth in claim 1, wherein said diffuser section has at least two circumferential series of orifices, the orifices in the first series being larger than those in the second series, whereby the jets from the larger orifices have greater penetrating power than those from the smaller orifices.

4. A system as set forth in claim 1, wherein said pump means are submerged in said sump chamber.

5. A system as set forth in claim 4, further including means to raise and lower the pump means.

6. A system as set forth in claim 1, wherein said ejector includes a converging nozzle which directs the motive fluid into a zone coupled to said disinfectant source.

7. A system as set forth in claim 6, wherein said zone is coupled to said source through a check valve.

8. A system as set forth in claim 6, wherein said zone leads into a throat of uniform diameter which joins said diffuser section, said section having a divergent internal diameter.

* * * * *